United States Patent Office 3,770,758
Patented Nov. 6, 1973

3,770,758
N-AZOLYL SULFENAMIDES
Joseph Edward Kerwood, Akron, Ohio, assignor to Monsanto Company, St. Louis, Mo.
No Drawing. Continuation-in-part of application Ser. No. 861,152, Sept. 25, 1969, now Patent No. 3,645,987, dated Feb. 29, 1972. This application Oct. 14, 1971, Ser. No. 189,133
Int. Cl. C07d 91/46
U.S. Cl. 260—305
11 Claims

ABSTRACT OF THE DISCLOSURE

Sulfenamide of the formula

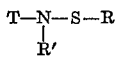

wherein R is alkyl, cycloalkyl, aralkyl, aryl or substituted aryl, where the substituents are alkyl, alkoxy, nitro, chloro, bromo, fluoro, iodo or hydroxy, R' is hydrogen, lower alkyl, cycloalkyl, or R"S— where R" has the same meaning as R and may be the same or different from R, T is azolyl or substituted azolyl selected from the group of thiazolyl, benzothiazolyl, benzoxazolyl, and substituted derivatives thereof, where the substituents are lower alkyl, chloro, bromo, fluoro, iodo, nitro or lower alkoxy are premature vulcanization inhibitors of vulcanizable elastomers.

REFERENCE TO RELATED APPLICATIONS

This application is a continuation-in-part of application Ser. No. 861,152, filed Sept. 25, 1969, now U.S. Pat. 3,645,987, issued Feb. 29, 1972.

BACKGROUND OF THE INVENTION

The invention relates to new compounds useful as inhibitors of premature vulcanization in rubber.

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz, premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

SUMMARY OF THE INVENTION

I have discovered a class of sulfenamides which are extremely valuable inhibitors of premature vulcanization. They are characterized by an azolyl group on the sulfenamide nitrogen and may be represented by the formula

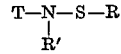

where R is alkyl, cycloalkyl, aralkyl, aryl, or alkaryl. R' is hydrogen, lower alkyl, cycloalkyl or R"S— where R" has the same meaning as R but is not necessarily the same radical as R, T is thiazolyl, benzothiazolyl, or benzoxazolyl. Aryl is a univalent organic radical the free valence of which belongs to an aromatic carbocyclic nucleus and not to a side chain. Both unsubstituted and substituted aryl and alkaryl radicals are suitable for practice of the present invention. The substituents may be alkyl as indicated above (alkaryl) or alkoxy, nitro, chloro, bromo, fluoro, iodo or hydroxy. It is preferred that the carbocyclic nucleus represented by R contain not more than one electronegative substituent. Aryl radicals of 6 to 12 nuclear carbon atoms are preferred. Alkyl radicals are aliphatic radicals of the series $C_nH_{2n+1}$. The alkyl radical may be primary, secondary or tertiary and the primary alkyl may be branched or unbranched. Alkyl radicals of 1–18 carbon atoms are preferred and a preferred subgroup are alkyl radicals of 3–12 carbon atoms. Lower alkyl means alkyl of 1–5 carbon atoms. The preferred cycloalkyl radicals contain 5–12 carbon atoms in the ring a preferred subgroup thereof containing 5–8 carbon atoms.

The azole radicals may be substituted or unsubstituted suitable substituents being lower alkyl, chloro, bromo, fluoro, iodo, nitro or lower alkoxy.

More specific examples of R are methyl, ethyl, propyl, isopropyl, butyl, isobutyl, sec. butyl, t-butyl, amyl, sec. amyl, tert-amyl, n-hexyl, 2-ethylhexyl, decyl, dodecyl, phenyl, naphthyl, benzyl, α,α'-dimethyl benzyl, phenethyl, 3-phenyl propyl, 4-phenylbutyl, p-chlorophenyl, p-nitrophenyl, xenyl, o-tolyl, m-tolyl, p-tolyl, xylyl, p-nonylphenyl, p-t-butylphenyl, cyclopentyl, cyclohexyl, cyclooctyl or cyclododecyl. Other examples of suitable azole radicals are 4-methylthiazolyl, 5-methylthiazolyl, 4-ethylthiazolyl, 4-chlorobenzothiazolyl, 5-chlorobenzothiazolyl, 6-ethoxybenzothiazolyl, 5,6-dimethylbenzothiazolyl, 6 - methoxybenzothiazolyl and 6-nitrobenzothiazolyl. In general the carbocyclic ring of benzothiazolyl, or benzoxazolyl may be substituted by lower alkyl, lower alkoxy, halogen or nitro.

Examples of the new compounds of the invention are:
N-(2-benzothiazolyl)ethylsulfenamide,
N-(2-benzothiazolyl)-t-butyl-sulfenamide,
N-(2-benzothiazolyl)-n-hexylsulfenamide,
N-(2-benzothiazolyl)cyclohexylsulfenamide,
N-(2-benzothiazolyl)phenylsulfenamide,
N-(2-benzothiazolyl)-p-chlorophenylsulfenamide,
N-(2-benzothiazolyl)-p-nitrophenylsulfenamide,
N-(2-benzothiazolyl)-N-ethylthio ethylsulfenamide,
N-(2-benzothiazolyl)-N-cyclohexylthio cyclohexylsulfenamide,
N-(2-benzothiazolyl)-N-(methyl)-propylsulfenamide,
N-(2-benzoxazolyl)-N-(n-butyl)-phenylsulfenamide,
N-(2-benzothiazolyl)-N-(cyclohexyl)phenylsulfenamide,
N-(2-benzothiazolyl)-N-(methyl)-p-chlorophenylsulfenamide,
N-(2-benzothiazolyl)-N-(tert-butyl)cyclopentylsulfenamide,
N-(2-benzothiazolyl)-cyclooctylsulfenamide,
N-(2-benzothiazolyl)-N-phenylthio phenylsulfenamide,
N-(2-benzoxazolyl)ethylsulfenamide,
N-(2-benzoxazolyl)-t-butylsulfenamide,
N-(2-benzoxazolyl)-n-hexylsulfenamide,
N-(2-benzoxazolyl)cyclohexylsulfenamide,
N-(2-benzoxazolyl)phenylsulfenamide,
N-(2-benzothiazolyl)-N-(methyl)ethylsulfenamide,
N-(2-benzothiazolyl)-N-(ethyl)-t-butylsulfenamide,
N-(2-benzothiazolyl)-N-(methyl)-n-hexylsulfenamide,
N-(2-benzothiazolyl)-N-(propyl)-cyclohexylsulfenamide,
N-(2-benzothiazolyl)-N-(propyl)phenylsulfenamide,
N-(2-thiazolyl)ethylsulfenamide,
N-(2-thiazolyl)-t-butylsulfenamide,
N-(2-thiazolyl)-n-hexylsulfenamide,
N-(2-thiazolyl)-cyclohexylsulfenamide, N-(2-thiazolyl)phenylsulfenamide,
N-[2-(4-chlorobenzothiazolyl)]ethylsulfenamide,
N-[2-(4-chlorobenzothiazolyl)]-t-butylsulfenamide,
N-[2-(4-chlorobenzothiazolyl)]-n-hexylsulfenamide,
N-[2-(4-chlorobenzothiazolyl)]cyclohexylsulfenamide,
N-[2-(4-chlorobenzothiazolyl)]phenylsulfenamide,
N-[2-(5-chlorobenzothiazolyl)]ethylsulfenamide,
N-[2-(5-chlorobenzothiazolyl)]-t-butylsulfenamide,
N-[2-(5-chlorobenzothiazolyl)]-n-hexylsulfenamide,
N-[2-(5-chlorobenzothiazolyl)]cyclohexylsulfenamide,
N-[2-(5-chlorobenzothiazolyl)]phenylsulfenamide,
N-[2-(6-ethoxybenzothiazolyl)]-ethylsulfenamide,
N-[2-(6-ethoxybenzothiazolyl)]-t-butylsulfenamide,
N-[2-(6-ethoxybenzothiazolyl)]-n-hexylsulfenamide,
N-[2-(6-ethoxybenzothiazolyl)]cyclohexylsulfenamide,
N-[2-(6-ethoxybenzothiazolyl)]phenylsulfenamide,
N-[2-(5,6-dimethylbenzothiazolyl)]ethylsulfenamide,
N-[2-(5,6-dimethylbenzothiazolyl)]-t-butylsulfenamide,
N-[2-(5,6-dimethylbenzothiazolyl)]-n-hexylsulfenamide,
N-[2-(5,6-dimethylbenzothiazolyl)]cyclohexylsulfenamide,
N-[2-(5,6-dimethylbenzothiazolyl)]phenylsulfenamide,
N-[2-(5,6-dimethylbenzothiazolyl)]-N-(methyl)ethylsulfenamide,
N-[2-(5,6-dimethylbenzothiazolyl)]-N-(propyl)-n-hexylsulfenamide,
N-[2-(5,6-dimethylbenzothiazolyl)]-N-(ethyl)-cyclohexylsulfenamide, and
N-[2-(5,6-dimethylbenzothiazolyl)]-N-(methyl)phenylsulfenamide.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing other types of blacks and fillers used in rubber compounding. The invention is also applicable to gum stocks.

The invention is applicable to rubber mixes containing sulfur-vulcanizing agents, peroxide-vulcanizing agents, organic accelerators for vulcanization, and antidegradants. The new compounds directly increase process safety of peroxide cures and are preferably used in the absence of organic accelerator when peroxide is the vulcanizing agent. With sulfur-vulcanizing agents organic accelerator will normally be present. Sulfur-vulcanizing agent means elemental sulfur or sulfur containing vulcanizing agent, for example, an amine disulfide or a polymeric polysulfide. Peroxide-vulcanizing agent means any of the organic peroxides which are curing agents for natural and synthetic rubber. One well-known curing agent is dicumyl peroxide. The technical literature describes in detail various procedures to effect peroxide cures. Certain patents also described the use of peroxide-vulcanizing agents, typical of which are U.S. 2,819,255 and 2,819,256 (1958).

The invention is applicable to vulcanization accelerators of various classes. For example, rubber mixes containing the aromatic thiazole accelerators which include N-cyclohexyl-2-benzothiazolesulfenamide,
N,N-dialkyl-2-benzothiazolesulfenamide,
2-mercaptobenzothiazole,
N-tert-butyl-2-benzothiazolesulfenamide,
2-benzothiazolyl diethyldithiocarbamate,
2,2'-dithiobisbenzothiazole and
2-(morpholinothio)benzothiazole may be used. Amine salts of mercaptobenzothiazole accelerators, for example, the t-butylamine salt, morpholine salt or 2,6-dimethyl morpholine salt of mercaptobenzothiazole may be used in the invention. Any of the thiazole accelerators may be used. Stocks containing accelerators, for example, tetramethylthiuram disulfide, tetramethylthiuram monosulfide, aldehyde amine condensation products, thiocarbamylsulfenamides, thioureas, xanthates, and guanidine derivatives, are substantially improved using the process of my invention. Examples of thiocarbamylsulfenamide accelerators are shown in U.S. Pats. 2,381,392, Smith assigned to Firestone; 2,388,236, Cooper assigned to Monsanto; 2,424,921, Smith assigned to Firestone; and British Pt. 880,912, Dadson assigned to Imperial Chemical Industries Limited. The invention is applicable to accelerator mixtures. The invention is applicable to stocks containing amine antidegradants. Rubber mixes containing antidegradants, for example, N-1,3-dimethylbutyl-N'-phenyl-p-phenylenediamine, N,N' - bis-(1,4-dimethylpentyl) - p - phenylenediamine, and other phenylenediamines, ketone, ether, and hydroxy antidegradants and mixtures thereof, are substantially improved using the process of my invention. Mixtures of antidegradants, for example, a mixture of N-1,3-dimethylbutyl-N'-phenyl-p-phenylenediamine and N,N'-bis(1,4-dimethylpentyl)-p-phenylenediamine, furnish a much improved final product when used with the inhibitors of this invention.

The inhibitors of my invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers, and the terms rubbers and diene rubbers are synonymous for the purpose of this invention.

The amount of inhibitor used depends upon the other components in the rubber formulation, the vulcanizing agent used, the accelerator used, the antidegradant used and other process variables which may be unique to a specific application. An experienced compounder can readily determine the amount needed for any particular situation. The amount usually is within the range of 0.1 to 5 parts by weight per 100 parts by weight of elastomer, and more often within the range of 0.3 to 2 parts by weight. The preferred usage generally falls within the range of 0.5 and 1.5 parts by weight inhibitor.

The compounds may be prepared by reacting the corresponding sulfenyl chloride with 2 - aminothiazole, 2-aminobenzothiazole, 2 - aminobenzoxazole, N - alkyl-2-aminobenzothiazole, or a substituted derivative thereof in the presence of a hydrogen chloride acceptor. The general reaction is

where $n$ is 1 or 2 and R and T have the same meaning as before. If different R substituents are desired where $n$ is 2, one mole of RSCl is reacted initially followed by reacting a different RSCl with

formed in the initial reaction.

An alternate method for preparing the compounds comprises reacting thiomide with an N-substituted-2-aminoazole. Examples of suitable thioimides are shown in U.S. 3,546,185, Dec. 8, 1970. The reaction is illustrated by the equation

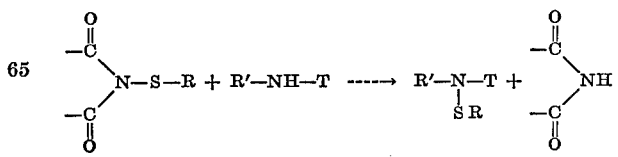

typical examples follow:

EXAMPLE 1

N-(2-benzothiazolyl)phenylsulfenamide

N-(2-benzothiazolyl)phenylsulfenamide is prepared in the following manner: 14.4 grams (0.1 mole) of benzene sulfenyl chloride dissolved in 38.6 grams of $CCl_4$ is added dropwise over a 20–30 minute period between 20–30° C. to a stirred slurry containing 15.0 grams (0.1 mole) of 2-aminobenzothiazole, 10.0 grams (0.128 mole) of pyridine, and 200 ml. of benzene. The slurry is held with stirring for one hour, filtered, and washed with benzene. The soluble portion is recovered by evaporation of the benzene and is a pink solid. The material is recrystallized from ethyl acetate to yield 6.0 grams of a solid which melts at 160° C. with decomposition. Analysis of the product gives 10.72% nitrogen and 24.98% sulfur. Calculated percentages for $C_{13}H_{10}N_2S_2$ are 10.77% nitrogen and 24.8% sulfur.

EXAMPLE 2

N-(2-benzothiazolyl)isobutylsulfenamide

N-(2-benzothiazolyl)isobutylsulfenamide is prepared by the addition of 97 ml. of a n-pentane solution containing 0.2 mole of isobutyl sulfenyl chloride dropwise over a 15 minute period to a stirred solution of 15.0 grams (0.1 mole) of 2-aminobenzothiazole and 20.0 grams of triethylamine dissolved in 150 ml. of N,N-dimethyl formamide (DMF) cooled to 0° C. The temperature is maintained between 0–7° C. by cooling with an external ice bath. The cooling bath is removed and the reaction mixture is stirred for 2 hours. The reaction mixture is filtered to remove triethylamine hydrogen chloride. An oil is separated from the filtrate by addition of 3.0 liters of ice water. The oil is extracted with one pound of ether by decanting the water away from the ether layer. The ether solution is dried over 100 grams of anhydrous sodium sulfate. The material is recovered by evaporation of the ether solution. The yellowish orange solid so recovered is recrystallized twice from heptane. The product melts at 97–99° C. Analysis of the product gives 11.72% nitrogen and 27.03% sulfur compared to 11.78% nitrogen and 26.9% sulfur calculated for $C_{11}H_{14}N_2S_2$.

EXAMPLE 3

N-(2-benzothiazolyl)-n-hexylsulfenamide

N-(2-benzothiazolyl)-n-hexylsulfenamide is prepared in the same manner as N-(2-benzothiazolyl)isobutylsulfenamide in Example 2 except n-hexyl sulfenyl chloride is used in place of isobutyl sulfenyl chloride. The product is recrystallized from heptane melts at 70–72° C. Analysis of the product shows 10.14% nitrogen and 23.15% sulfur. Calculated percentages for $C_{13}H_{18}N_2S_2$ are 10.53% nitrogen and 23.05% sulfur.

EXAMPLE 4

N-(2-benzothiazolyl)cyclohexylsulfenamide

N-(2-benzothiazolyl)cyclohexylsulfenamide is prepared in the following manner: 140 ml. of a solution containing 37.5 grams (0.25 mole) of cyclohexyl sulfenyl chloride in n-pentane is added slowly over a 30 minute period of a stirred solution of 37.5 grams (0.25 mole) of 2-amino benzothiazole and 30.0 grams (0.3 mole) of triethylamine dissolved in 250 ml. of DMF. The temperature rises from 25° C. to 30° C. The reaction is quenched by the addition of 2.5 liters of ice water to the slurry. The amine salt is dissolved and a thick viscous oil results. After decanting the water from the oil layer, ether is added to the oil layer from which a tan solid is crystallized overnight. The tan solid is slurried in a 50/50 mixture of heptane and ethyl alcohol and is filtered. 38.0 grams of a white solid is obtained. This material is recrystallized from toluene two times to yield 27.0 grams of a solid, which melts at 156–158° C. Analysis of the product indicates 10.37% nitrogen and 24.13% sulfur compared to 10.62% nitrogen and 24.20% sulfur calculated for $C_{13}H_{16}N_2S_2$.

EXAMPLE 5

N-(2-benzothiazolyl)-N-(phenylthio)phenylsulfenamide 28.8 grams (0.2 mole) of benzene sulfenyl chloride dissolved in 86.2 grams of $CCl_4$ is added over a 30 minute period to a stirred solution of 15.0 grams (0.1 mole) of 2-aminobenzothiazole and 25.0 grams (0.2 mole) of triethylamine in 150 ml. of DMF cooled to −5° C. The temperature is maintained between −5° and −10° C. during which a yellow orange precipitate forms. The reaction mixture is allowed to warm to room temperature. The reaction is quenched by the addition of ice water and a gummy semisolid forms. After decanting the water, a reddish solid is obtained by filtration. This material is recrystallized twice from heptane to give a solid which melts with decomposition at 112–115° C. A portion of the sample is reduced with NaI and is titrated with sodium thiosulfate to give an assay which confirms a bis-substituted compound. Analysis of the product shows 7.68% nitrogen compared to 7.28% nitrogen calculated for $C_{19}H_{14}N_2S_3$.

EXAMPLE 6

N-(5,6-dimethyl-2-benzothiazolyl)cyclohexylsulfenamide

Cyclohexyl sulfenyl chloride (0.25 mole) dissolved in 150 ml. of n-pentane is added dropwise over a 30 minute period to a stirred solution of 44.5 grams (0.25 mole) of 5,6-dimethyl-2-aminobenzothiazole and 30.0 grams of triethylamine in 200 ml. of DMF at room temperature. A slight rise in temperature is observed. The mixture is stirred two hours then quenched with two liters of water. After decanting the water, the oil layer is extracted with benzene and dried over sodium sulfate. Upon evaporation of the benzene, 69.0 grams (95% yield) of product is obtained. Recrystallized from toluene, the product is a white solid which melts at 153–155° C.

EXAMPLE 7

N-(2-thiazolyl)-N-(cyclohexylthio)cyclohexylsulfenamide

Cyclohexyl sulfenyl chloride dissolved in 300 ml. of n-pentane is added to 2-aminothiazole and triethylamine in 200 ml. of DMF at room temperature. The reaction mixture is quenched with water and the organic layer extracted with ether. Evaporation of the ether gives 78.7 grams of product.

EXAMPLE 8

N-(2-benzothiazolyl)-2,4-dinitrophenylsulfenamide 2,4-dinitrobenzene sulfenyl chloride (0.05 mole) in 100 ml. of $CCl_4$ is added dropwise over a period of 30 minutes to a solution of 2-aminobenzothiazole (0.05 mole) and pyridine (0.064 mole) in 750 ml. of DMF at room temperature. The mixture is stirred for one hour and the $CCl_4$ removed by evaporation. One liter of water is added and the precipitate is recovered by filtration. The solid is washed with isopropanol, filtered and dried. The product melts at 225–227° C.

EXAMPLE 9

N-methyl-N-(2-benzothiazolyl)phenylsulfenamide

Phenyl sulfenyl chloride (0.02 mole) in 12 ml. of benzene and triethylamine (0.03 mole) are added to N-methyl-2-aminobenzothiazole (0.02 mole) at room temperature. After stirring overnight, the mixture is filtered to remove the triethylamine salt. The filtrate is evaporated to give the desired product which after recrystallization from isopropanol melts at 112–113° C. Identification is confirmed by nuclear magnetic spectroscopy. Analysis of the product gives 61.92% carbon, 4.57% hydrogen, 10.38% nitrogen and 23.49% sulfur compared to 61.7% carbon, 4.4% hydrogen, 10.2% nitrogen and 23.5% sulfur calculated for $C_{14}H_{12}N_2S_2$.

EXAMPLE 10

N-methyl-N-(2-benzothiazolyl)cyclohexylsulfenamide

A mixture of N-methyl-2-aminobenzothiazole (0.23 mole) and N-(cyclohexylthio)phthalimide (0.23 mole)

in 300 ml. of ethanol is heated at reflux with stirring for four hours. The mixture is cooled and stirred at room temperature for 24 hours. 700 ml. of water containing 0.3 mole of NaOH are added to convert the phthalimide by-product to the soluble salt. The mixture is cooled to 0° C. and filtered to recover the product which is washed with water and air dried. The white solid product is recovered in 97% yield, M.P. crystallized from heptane 63–64° C. Analysis gives 10.06% nitrogen and 23.21% sulfur compared to 10.06% nitrogen and 23.03% sulfur calculated for $C_{14}H_{18}N_2S_2$.

EXAMPLE 11

N-cyclohexyl-N-(2-benzothiazolyl)-cyclohexylsulfenamide

A mixture of N-cyclohexyl-2-aminobenzothiazole (0.2 mole) and N-(cyclohexylthio)phthalimide (0.2 mole) in 300 ml. of ethanol is heated at reflux for four hours and stirred at 25–30° C. for 18 hours. 600 ml. of water containing 0.25 mole of NaOH is added. After stirring 15 minutes, one liter of ether is added. The ether layer is separated, washed with water until neutral and dried over sodium sulfate. The ether is removed in vacuum at the maximum temperature of 80–90° C. at 1–2 mm. Hg to give a viscous liquid which is identified as the desired product. Analysis gives 8.25% nitrogen and 18.37% sulfur compared to 9.08% nitrogen and 18.51% sulfur calculated for $C_{19}H_{26}N_2S_2$.

EXAMPLE 12

N-propyl-N-(2-benzothiazolyl)-cyclohexylsulfenamide

A mixture of N-propyl-2-aminobenzothiazole (0.2 mole) and N-(cyclohexylthio)phthalimide (0.2 mole) in 300 ml. of ethanol are heated at reflux for five hours. 500 ml. of water containing 0.25 mole of NaOH is added and the mixture is filtered to remove some unreacted starting material. The filtrate is extracted with ether and the product removed by evaporation. Analysis gives 8.85% nitrogen and 21.18% sulfur compared to 9.14% nitrogen and 20.93% sulfur calculated for $C_{16}H_{22}N_2S_2$.

EXAMPLE 13

N-ethyl-N-(2-benzothiazolyl)-cyclohexylsulfenamide

A mixture of N-ethyl-2-aminobenzothiazole (0.2 mole) and N-(cyclohexylthio)phthalimide (0.2 mole) in 300 ml. of ethanol is treated according to the procedure of Example 1. A liquid product is obtained in 85% yield. Analysis gives 9.75% nitrogen and 21.75% sulfur compared to 9.58% nitrogen and 21.93% sulfur calculated for $C_{15}H_{20}N_2S_2$.

EXAMPLE 14

N-(2-thiazolyl)cyclohexylsulfenamide

To a reactor, there is charged 2-aminothiazole (0.1 mole), N-(cyclohexylthio)phthalimide (0.1 mole) and 200 ml. of heptane. The mixture is heated at reflux for six hours and filtered hot to separate phthalimide. The filtrate is evaporated to give a red precipitate which is recrystallized from hexane to give the desired product, M.P. 82–84° C. Identification is confirmed by NMR.

EXAMPLE 15

N-propyl-N-(2-benzoxazolyl)cyclohexylsulfenamide

A mixture of N-propyl-2-benzoxazolyl (0.1 mole) and N-(cyclohexylthio)phthalimide in 200 ml. of heptane is heated for six hours at reflux. The mixture is filtered hot to remove phthalimide. The filtrate is evaporated and the residue taken up in hexane. Additional phthalimide and reactants are recovered from the hexane fraction. Evaporation of the hexane gives an oil which is identified as the desired product.

The following tables illustrate the improved processing safety obtained by incorporating the new compounds into rubber. For all the rubber stocks tested and described, infra, as illustrative of the invention, Mooney scorch times at 121° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the natural rubber stocks at 144° C. and synthetic rubber stocks at 153° C. Curing characteristics are determined by means of the Monsanto Oscillating Disc Rheometer described by Decker, Wise, and Guerry in Rubber World, December 1962, p. 68. From the rheometer data the maximum torque is recorded in rheometer units, $t_2$ is the time in minutes for a rise of two rheometer units, above the minimum reading and $t_{90}$ is the time required to obtain a torque 90% of the maximum.

The trademarks of some compounds used in the practice of this invention are Santocure MOR, Santocure NS and Santoflex 13. MOR is the accelerator 2-(morpholinothio)benzothiazole and NS is the accelerator N-tert-butyl-2-benzothiazolesulfenamide. Santoflex 13 is the antidegradant N-(1,3-dimethyl butyl)-N'-phenyl-p-phenylenediamine.

The compounds of this invention are excellent premature vulcanization inhibitors. In a natural rubber masterbatch, the scorch delay is increased 186% when N-(2-benzothiazolyl)phenylsulfenamide is used.

| Masterbatch: | Parts |
|---|---|
| Smoked sheets | 100 |
| Furnace black (ISAF) | 45 |
| Zinc oxide | 3 |
| Stearic acid | 2 |
| Hydrocarbon softener | 5 |
| Total parts | 155 |

| Stock | A | B | C | D | E | F | G |
|---|---|---|---|---|---|---|---|
| Masterbatch | 155.0 | 155.0 | 155.0 | 155.0 | 155.0 | 155.0 | 155.0 |
| Sulfur | 2.5 | 2.5 | 2.5 | 2.5 | 2.5 | 2.5 | 2.5 |
| Santocure MOR | 0.5 | 0.5 | 0.5 | 0.5 | 0.5 | 0.5 | 0.5 |
| N-(2-benzothiazolyl)phenylsulfenamide | | 1.0 | | | | | |
| N-(2-benzothiazolyl)-N-(phenylthio)phenylsulfenamide | | | 1.0 | | | | |
| N-(2-benzothiazolyl)isobutylsulfenamide | | | | 1.0 | | | |
| N-(2-benzothiazolyl)-n-hexylsulfenamide | | | | | 1.0 | | |
| N-(2-benzothiazolyl)cyclohexylsulfenamide | | | | | | 1.0 | |
| N-(5,6-dimethyl-2-benzothiazolyl)cyclohexylsulfenamide | | | | | | | 1.0 |
| Santoflex 13 | 2.0 | 2.0 | 2.0 | 2.0 | 2.0 | 2.0 | 2.0 |
| Mooney scorth at 121° C.: | | | | | | | |
| $t_5$ | 25.7 | 73.1 | 67.5 | 52.3 | 47.8 | 65.5 | 86.7 |
| Percent increase in scorch delay | | 186 | 162 | 104 | 86 | 155 | [1] 146 |
| Rheometer at 144° C.: | | | | | | | |
| Maximum torque | 59.0 | 64.7 | 62.9 | 64.4 | 62.2 | 59.9 | 67.0 |
| $t_2$ | 8.0 | 16.2 | 17.0 | 14.5 | 13.3 | 14.6 | 20.3 |
| $t_{90}$ | 22.5 | 33.3 | 31.6 | 29.0 | 27.3 | 30.7 | 41.0 |

[1] This stock was run at a different time and the control $t_5$ was 35.2 minutes.

In an oil-extended styrene-butadiene rubber masterbatch, scorch delay is increased 122% when one part of N-(2-benzothiazolyl)cyclohexylsulfenamide is used and 50% when 0.4 part of N-methyl-N-(2-benzothiazolyl)cyclohexylsulfenamide is used.

Masterbatch:

| | Parts |
|---|---|
| SBR 1712 | 137.5 |
| Furnace black (ISAF) | 65.0 |
| Zinc oxide | 3.0 |
| Stearic acid | 1.0 |
| Hydrocarbon softener | 1.5 |
| Total parts | 208.0 |

| Stock | H | I | J | K |
|---|---|---|---|---|
| Masterbatch | 208.0 | 208.0 | 208.0 | 208.0 |
| Sulfur | 1.75 | 1.75 | 2.0 | 2.0 |
| Santocure NS | 1.2 | 1.2 | 1.0 | 1.0 |
| N-(2-benzothiazolyl)cyclohexylsulfenamide | | 1.0 | | |
| N-methyl-N-(2-benzothiazolyl)cyclohexylsulfenamide | | | | 0.4 |
| Santoflex 13 | 2.0 | 2.0 | 2.0 | 2.0 |
| Mooney scorch at 121° C.: | | | | |
| $t_5$ | 17.5 | 38.8 | 22.0 | 33.0 |
| Percent increase in scorch delay | | 122 | | 50 |
| Rheometer at 153° C.: | | | | |
| Maximum torque | 53.5 | 51.8 | 49.0 | 49.0 |
| $t_2$ | 7.9 | 13.0 | 9.5 | 11.3 |
| $t_{90}$ | 21.2 | 27.2 | 24.5 | 26.5 |

The premature vulcanization inhibitor activity of other compounds of the invention is illustrated in a natural rubber masterbatch.

| Stock | L | M | N | O | P | Q | R |
|---|---|---|---|---|---|---|---|
| Masterbatch | 155.0 | 155.0 | 155.0 | 155.0 | 155.0 | 155.0 | 155.0 |
| Sulfur | 2.2 | 2.2 | 2.2 | 2.2 | 2.0 | 2.0 | 2.2 |
| Santocure NS | 0.5 | 0.5 | 0.5 | 0.5 | 0.5 | 0.5 | 0.5 |
| N-methyl-N-(2-benzothiazolyl)cyclohexylsulfenamide | 0.4 | | | | | | |
| N-ethyl-N-(2-benzothiazolyl)cyclohexylsulfenamide | | 0.4 | | | | | |
| N-propyl-N-(2-benzothiazolyl)cycohexylsulfenamide | | | 0.4 | | | | |
| N-cyclohexyl-N-(2-benzothiazolyl)cyclohexylsulfenamide | | | | 0.4 | | | |
| N-(2-thiazolyl)cyclohexylsulfenamide | | | | | 0.5 | | |
| N-propyl-N-(2-benzoxazolyl)cyclohexylsulfenamide | | | | | | 0.5 | |
| N-methyl-N-(2-benzothiazolyl)phenylsulfenamide | | | | | | | 0.5 |
| Santoflex 13 | 2.0 | 2.0 | 2.0 | 2.0 | 2.0 | 2.0 | 2.0 |
| Mooney scorch at 121° C.: | | | | | | | |
| $t_5$ | 73.6 | 60.5 | 62.2 | 46.5 | 47.0 | 35.4 | 61.9 |
| Percent increase in scorch delay | 87 | 54 | 58 | 18 | 125 | 69 | 79 |

The compounds of this invention where R is aryl or alkyl have bactericidal properties. Such compounds are toxic to a spectrum of microorganisms, including *S. aureus*, *S. typhosa*, *PS. aeruginosa*, and *A. niger*.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

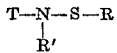

wherein R is alkyl of 1–18 carbon atoms, cycloalkyl of 5–8 carbon atoms, aralkyl of 7–10 carbon atoms or aryl of 6–12 nuclear carbon atoms, or substituted said aryl, where the substituents are alkyl of 1–9 carbon atoms, methoxy, ethoxy, nitro, chloro, bromo, fluoro, iodo or hydroxy, R' is hydrogen, lower alkyl, cycloalkyl of 5–8 carbon atoms or R''S— where R'' has the same meaning as R and may be the same or different from R, T is benzothiazolyl, and substituted derivatives thereof, where the substituents are lower alkyl, chloro, bromo, fluoro, iodo, nitro, methoxy or ethoxy.

2. A compound according to claim 1 wherein R is alkyl, cycloalkyl, or aryl, R' is hydrogen or alkylthio, cycloalkylthio, arylthio, and T is benzothiazolyl.

3. A compound according to claim 1 wherein R is alkyl, cycloalkyl, or aryl, R' is hydrogen and T is benzothiazolyl.

4. The compound according to claim 3 wherein R is n-hexyl.

5. A compound according to claim 3 wherein R is isobutyl.

6. The compound according to claim 3 wherein R is cyclohexyl.

7. The compound according to claim 2 wherein R is phenyl, R' is phenylthio, and T is benzothiazolyl.

8. A compound according to claim 1 wherein R is aryl or cycloalkyl, R' is H or R''S where R'' is aryl or cycloalkyl and T is benzothiazolyl.

9. A compound according to claim 1 wherein R is alkyl, cycloalkyl, or aryl, R' is lower alkyl and T is benzothiazolyl.

10. The compound according to claim 9 wherein R is cyclohexyl and R' is methyl.

11. The compound according to claim 9 wherein R is phenyl and R' is methyl.

References Cited

UNITED STATES PATENTS 3,645,987  2/1972  Kerwood _____ 260—305

RICHARD J. GALLAGHER, Primary Examiner

U.S. Cl. X.R.

260—79.5 B, 306.8 R, 307 D, 309.2, 999